(No Model.)

J. PECKOVER.
STONE SAW.

No. 369,958. Patented Sept. 13, 1887.

Witnesses
David S. Williams
Harry Drury

Inventor
James Peckover
By his Attorneys Howson & Sons

UNITED STATES PATENT OFFICE.

JAMES PECKOVER, OF PHILADELPHIA, PENNSYLVANIA.

STONE-SAW.

SPECIFICATION forming part of Letters Patent No. 369,958, dated September 13, 1887.

Application filed June 20, 1887. Serial No. 241,861. (No model.)

*To all whom it may concern:*

Be it known that I, JAMES PECKOVER, a subject of the Queen of Great Britain and Ireland, residing at Philadelphia, Pennsylvania, have invented certain Improvements in Stone-Saws, of which the following is a specification.

The object of my invention is to construct as economically as possible a stone-saw which shall be strong and not liable to get out of order, and which shall be thoroughly effective in action by permitting the sand or other cutting granular material to pass to the bottom of the saw-kerf, and so that the minimum amount of power shall be required to drive the saw or gang of saws. This object I attain by constructing the stone-saw with projecting teeth in one piece with the saw-blade and of greater thickness than the blade, as hereinafter set forth.

Figure 1:
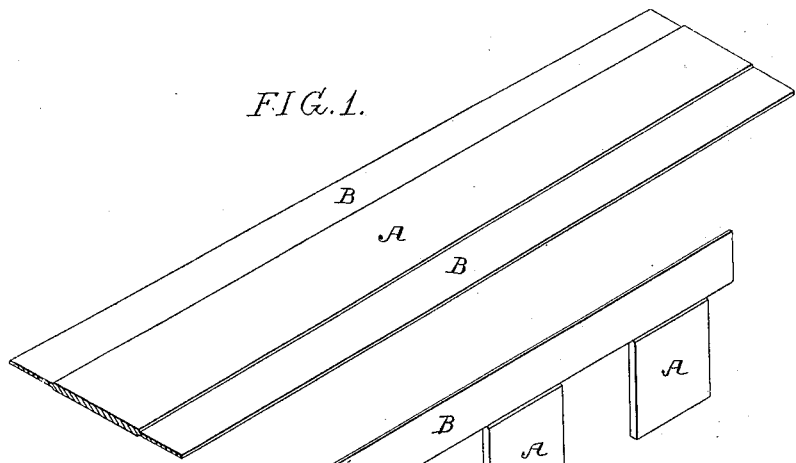
Figure 2:
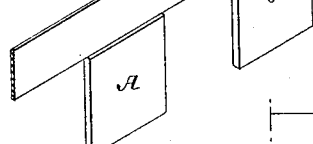
Figure 3:
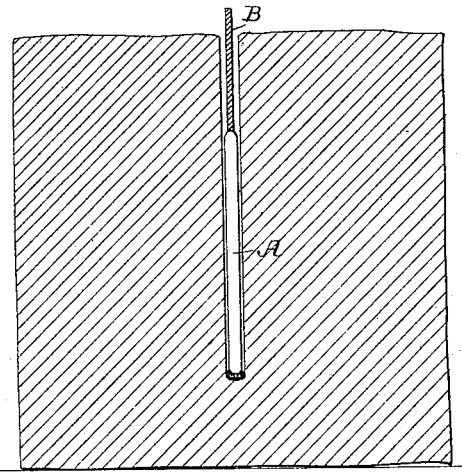

In the accompanying drawings, Figure 1 is a perspective view illustrating the form of blank from which, for the sake of economy, I prefer to cut my improved saw. Fig. 2 is a perspective view of sufficient of my improved saw to illustrate my invention. Fig. 3 is a view drawn to a larger scale and illustrating the action of the saw in sawing stone, and Fig. 4 is a view of a modification.

In the Letters Patent granted to me January 19, 1886, No. 334,678, I have illustrated and described a construction of stone-saw in which the projecting teeth are made thicker than the saw-blade; but in that case the teeth were separate inserted teeth, and were consequently somewhat expensive to make and difficult to retain in place, the teeth being liable to drop out. I remove these objections by making the projecting thickened teeth in one piece with the blade, as I will now describe.

In practice I by preference construct my improved saws by first rolling an iron blank of the form illustrated in Fig. 1—that is, with a central portion, A, somewhat thicker than the edges B B. Then by suitable means I cut this blank so as to produce therefrom two saws of the form illustrated in Fig. 2, the thickened portion A of the blank forming the projecting teeth of two saws. The metal cut from between the teeth of one saw forms the teeth of the other saw, while the thinner edges B B of the blank form the blades of the two saws.

Figure 4:
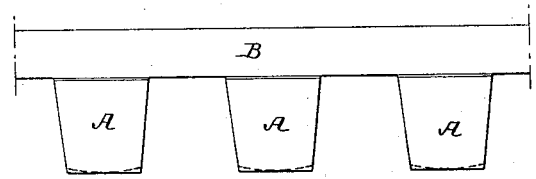

By preference I make the adjacent edges of the teeth of each saw parallel, as shown in Fig. 2; but this is not essential, as in some cases the teeth may be of the tapering form illustrated in Fig. 4. The cutting-edges of the teeth may be slightly rounded, as indicated by dotted lines in Fig. 4, with either form of tooth; but this I do not regard as necessary, as the teeth will naturally become worn to this shape when put into use.

A stone-saw of the construction described possesses the advantages not only of strength and economy of construction, but it also permits the sand or other granular material which is fed to the saw to pass directly to the bottom of the saw-kerf. This will be readily understood on reference to Fig. 3, which shows in section the saw in position in the kerf. A supply of sand can thus be continuously kept in effective action at the bottom of the saw-kerf under the saw-teeth without any tendency to wedge the saw in the kerf, as would be the case if the blades were made simply tapering upward from a widened cutting-edge. The friction commonly experienced between the blade of the saw and the walls of the kerf is by this construction greatly reduced, and consequently the power necessary to drive a saw or gang of saws of the construction described is much less than if the blade were of the same thickness as the teeth.

The teeth are made of substantially uniform thickness throughout, in order that they may wear as long as possible, and in order that there may be the least possible tendency for the sand to wedge in between the sides of the teeth and the walls of the kerf.

I claim as my invention—

A stone-saw having projecting teeth in one piece with the blade, said teeth being thicker than the blade and of substantially uniform thickness throughout, as and for the purpose set forth.

In testimony whereof I have signed my name to this specification in the presence of two subscribing witnesses.

JAMES PECKOVER.

Witnesses:
 JOHN SPARHAWK, Jr.,
 WILLIAM D. CONNER.